Aug. 5, 1924.
M. SPRANGERS
KETTLE COVER HOLDER
Filed April 23, 1923
1,503,857
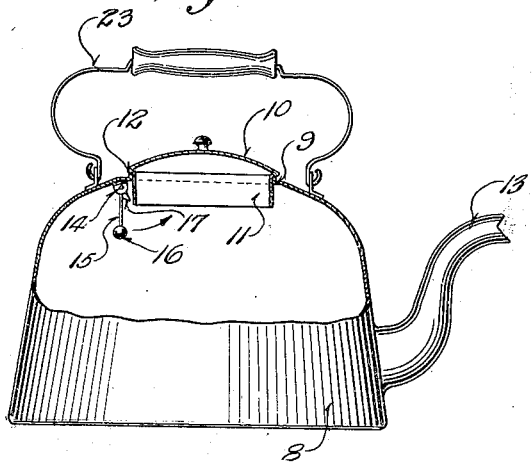
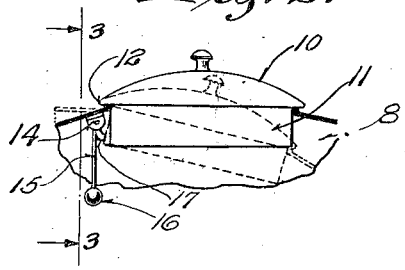
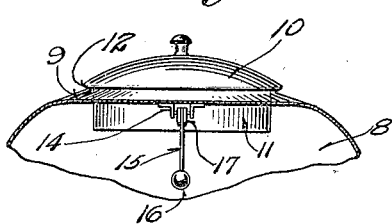
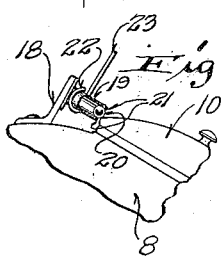
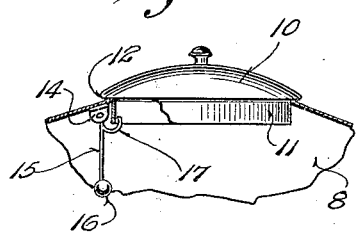
Inventor!
Mathias Sprangers.
By Morsell, Keeney & Morsell
Attorneys.

Patented Aug. 5, 1924.

1,503,857

UNITED STATES PATENT OFFICE.

MATHIAS SPRANGERS, OF MILWAUKEE, WISCONSIN.

KETTLE-COVER HOLDER.

Application filed April 23, 1923. Serial No. 633,996.

*To all whom it may concern:*

Be it known that I, MATHIAS SPRANGERS, a citizen of the United States, and resident of Milwaukee, in the county of Milwaukee and State of Wisconsin, have invented new and useful Improvements in Kettle-Cover Holders, of which the following is a description, reference being had to the accompanying drawings, which are a part of this specification.

This invention relates to improvements in kettles, and more particularly to a means whereby the cover of the kettle will not become dislodged or fall off when the kettle is tilted in use, as when pouring.

Kettles and vessels of that type in common use have the covers therefor lodged within the cover opening, and no means are provided for locking the cover in position. Consequently, when the kettle or vessel is tilted to pour the contents therefrom, the cover is apt to fall off or the contents come gushing out of the cover opening.

With the above in mind, therefore, the present invention contemplates providing a locking means for a kettle cover whereby the cover will be held in place when the kettle is tilted.

A further object of the invention is to provide a kettle cover locking means which is inoperative when the kettle is in a normal horizontal position.

A further object of the invention is to provide a device of the class described with which the ordinary form of kettle may be easily equipped.

A further object of the invention is to provide a kettle cover holder which is of very simple construction, is strong and durable, and is well adapted for the purpose described.

With the above and other objects in view, the invention consists of the improved kettle cover holder and its parts and combinations as set forth in the claims, and all equivalents thereof.

Referring now more particularly to the accompanying drawing, in which the same reference characters indicate the same parts in all of the views:

Fig. 1. is a side view of a kettle provided with the improved kettle cover holder, part being broken away and shown in section;

Fig. 2 is a fragmentary view showing the normal position of the locking means, and also showing in dotted lines the position when the vessel is tilted;

Fig. 3 is a sectional view taken on the line 3—3 of Fig. 2;

Fig. 4 is a fragmentary view of a modified form of the invention, part being broken away and shown in section; and Fig. 5 is a fragmentary sectional view of a second modified form of the invention.

Referring to the drawing, the numeral 8 indicates the usual form of kettle provided with an opening 9 and a cover 10 therefor. The cover is of the usual form with an annular flange 11 and a shoulder 12 which rests on the metal of the kettle adjacent the opening. Secured to the inner surface of the kettle adjacent the opening and preferably on a line with the kettle spout 13 is a pair of ears 14 and said ears have pivotally suspended therefrom, as shown in Fig. 3, a rod 15, formed with a weight 16 at its lower end. Formed integrally with said rod and adjacent the cover flange 11 is a projection 17 which is adapted to engage the cover flange as will be explained.

In the form of the invention shown in Figs. 1, 2 and 3, when the kettle is tilted, as in pouring, the projection 17 will bear against the outer surface of the cover flange and force the cover tightly against the opposite edge of the opening, thereby firmly holding it in place. This action is due to the fact that gravity will cause the weighted rod 15 to maintain a vertical position at all times while a movement of the kettle will change the positions of the projection and cover flange with respect to each other so that they will come into bearing contact.

In the modified form of the invention shown in Fig. 4, the cover flange 11 is somewhat narrower than in the usual form of kettle cover. The projection 17 is hook-shaped and positioned so that its outer end portion will be adjacent the inner surface of the cover flange. Hence, when the kettle is tilted, the hook 17 will bear against the inner surface of the kettle flange forcing it tightly against the edge of the kettle opening adjacent the ears.

Fig. 5 illustrates a second modified form of the invention. An upstanding flange 18 is secured to the outer surface of the kettle on a line with the kettle spout and comparatively close to the kettle opening. Secured to the upper portion of said flange at right angles thereto is a tubular member 19 which encloses a ball 20 free to ride therein, but held therein by means of the flanged extremities 21 of the tube. When the kettle is tilted, the ball will roll in the tube to its outer limit and in that position it will partially overlie the outer adjacent edge of the cover to retain it in place. When the kettle is not tilted, the ball will not bear against the cover and the cover is therefore freely removable. The end portion 22 of the kettle handle 23 is secured about the tube, as shown.

From the foregoing description, it will be seen that the improved kettle cover holder is inoperative when the kettle is in normal position and the cover is free to be removed, and when the kettle is tilted the cover is automatically held in place. Furthermore, the device is of very simple construction and well adapted for the purpose described.

What I claim as my invention is:

1. The combination with a vessel having a removable cover, of a gravity actuated device secured to the vessel adjacent the cover for automatically locking said cover in place only when the vessel is tilted, there being a relative movement of the device and cover toward each other.

2. The combination with a vessel having a removable cover provided with a flange, of a gravity actuated device for locking said cover in place when the vessel is tilted, said device comprising a weighted rod pivotally suspended from the inner surface of the vessel, and a dog formed thereon to engage the cover flange.

3. The combination with a vessel having a removable cover and a spout, of a gravity actuated device secured to the inner surface of the vessel adjacent the cover and on a line with the spout for automatically locking said cover in place when the vessel is tilted, said device comprising a rod pivotally secured to the vessel and having a weight at its lower end, and a dog formed on the upper portion of the rod and positioned so as to engage the cover flange.

4. The combination with a vessel having a removable cover, of an automatically actuated device for locking said cover in place when the vessel is tilted but permitting the free removal of the cover when the vessel is in normal position, said device being connected to the vessel adjacent the cover.

In testimony whereof, I affix my signature.

MATHIAS SPRANGERS.